United States Patent
Nakamura et al.

(10) Patent No.: US 12,067,445 B2
(45) Date of Patent: Aug. 20, 2024

(54) COMMUNICATION APPARATUS

(71) Applicant: TOSHIBA TEC KABUSHIKI KAISHA, Tokyo (JP)

(72) Inventors: Koki Nakamura, Sunto Shizuoka (JP); Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/743,817

(22) Filed: May 13, 2022

(65) Prior Publication Data

US 2023/0056949 A1  Feb. 23, 2023

(30) Foreign Application Priority Data

Aug. 20, 2021 (JP) .................. 2021-134750

(51) Int. Cl.
G06K 7/08 (2006.01)
G06K 7/10 (2006.01)

(52) U.S. Cl.
CPC ................. G06K 7/10316 (2013.01)

(58) Field of Classification Search
CPC .......... G06K 19/0723; G06K 7/10356; G06K 7/10316; G06K 19/07749; G06K 19/07773; G06Q 20/3278; G06Q 20/203; G06Q 30/0639
USPC ........................ 235/451, 492, 462.46, 472.02
See application file for complete search history.

(56) References Cited

U.S. PATENT DOCUMENTS

| | | | | |
|---|---|---|---|---|
| 6,868,073 B1* | 3/2005 | Carrender | ................ | G01S 5/14 370/278 |
| 10,101,435 B1* | 10/2018 | Farrell | ................ | G01S 5/06 |
| 10,860,818 B2 | 12/2020 | Oishi | | |
| 2006/0044147 A1* | 3/2006 | Knox | ................ | G01S 13/825 340/8.1 |
| 2010/0039228 A1* | 2/2010 | Sadr | ................ | G01S 5/12 340/10.1 |
| 2010/0109914 A1* | 5/2010 | Tieman | ................ | G08G 1/205 340/991 |
| 2015/0302708 A1* | 10/2015 | Hattori | ................ | H01Q 21/28 705/16 |
| 2019/0102584 A1* | 4/2019 | Enomoto | ........... | G06K 7/10366 |
| 2019/0180063 A1* | 6/2019 | Suzuki | ............. | G06K 7/10009 |

* cited by examiner

*Primary Examiner* — Daniel St Cyr
(74) *Attorney, Agent, or Firm* — FOLEY & LARDNER LLP

(57) ABSTRACT

A communication apparatus includes an antenna, an actuator assembly, a transducer, and a controller. The actuator assembly is configured to move the antenna in two dimensions relative to a space configured to contain a wireless tag. The transducer is configured to provide phase data indicating a phase of a signal transmitted from the wireless tag in at least (a) a first detection condition in which the antenna has a first position relative to the space and (b) a second detection condition in which the antenna has a second position relative to the space. The controller is configured to determine whether the wireless tag is located inside of the space based on the phase data.

18 Claims, 7 Drawing Sheets

COMMUNICATION APPARATUS

CROSS-REFERENCE TO RELATED APPLICATION

This application is based upon and claims the benefit of priority from Japanese Patent Application No. 2021-134750, filed on Aug. 20, 2021, the entire contents of which are incorporated herein by reference.

FIELD

Embodiments described herein relate to a communication apparatus.

BACKGROUND

For example, when merchandise held in a shopping basket is identified by wireless communication with a wireless tag attached to the merchandise held in the shopping basket, if wireless communication with a wireless tag not held in the shopping basket is established, the merchandise with the wireless tag may be erroneously identified as the merchandise held in the shopping basket. Accordingly, a technique of checking whether or not the wireless tag is located within a predetermined area based on a phase difference of electromagnetic wave received from the same wireless tag in different two reception positions is devised.

However, regarding the phase difference with respect to the two reception positions, there is a combination of locations with the same phase difference inside and outside of the area, and it may be impossible to determine whether or not a wireless tag located in one of the locations of the combination is located within the area.

Under the circumstance, a communication apparatus that may determine with higher accuracy whether or not a wireless tag is located within an area is desired.

DETAILED DESCRIPTION

A challenge to be solved is to provide a communication apparatus that may determine whether or not a wireless tag is located within an area with higher accuracy.

A communication apparatus of an embodiment includes an antenna, an actuator assembly, a transducer, and a controller. The actuator assembly is configured to move the antenna in two dimensions relative to a space configured to contain a wireless tag. The transducer is configured to provide phase data indicating a phase of a signal transmitted from the wireless tag in at least (a) a first detection condition in which the antenna has a first position relative to the space and (b) a second detection condition in which the antenna has a second position relative to the space. The controller is configured to determine whether the wireless tag is located inside of the space based on the phase data.

Figure 1:
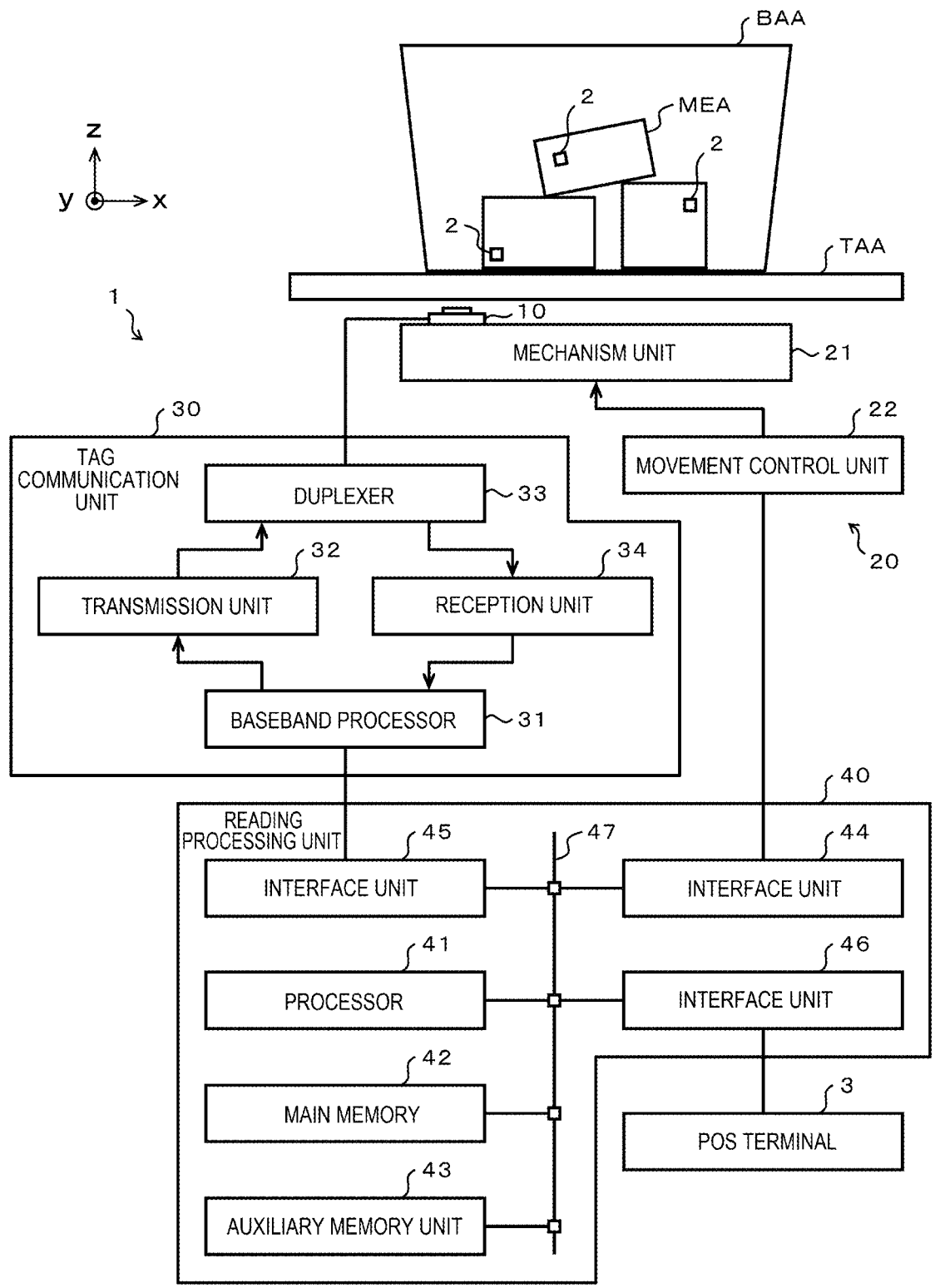
FIG. 1 shows a configuration of a tag reading apparatus according to respective embodiments.

As below, several embodiments will be explained using the drawings. In the respective embodiments, a tag reading apparatus (e.g., a tag reader) configured to have functions as a communication apparatus (e.g., a tag locator assembly) will be explained as an example. Prior to the explanation of the respective embodiments, configurations that the respective embodiments have in common will be explained. FIG. 1 shows a configuration of a tag reading apparatus 1 (e.g., a tag reader) according to the respective embodiments. Note that, in FIG. 1, part of a structure of the tag reading apparatus 1 is schematically shown. Further, in FIG. 1, part of a circuit configuration of the tag reading apparatus 1 is shown by a block diagram.

The tag reading apparatus 1 reads tag data respectively stored in wireless tags 2 attached to merchandise MEA. The tag reading apparatus 1 generates a merchandise list showing a list of purchased merchandise based on the read tag data, and outputs the list to a point-of-sale (POS) terminal 3. The tag reading apparatus 1 has a function as a communication apparatus communicating with the wireless tags 2 for reading the tag data.

The wireless tag 2 is also referred to as "radio frequency identification (RFID) tag". The wireless tag 2 includes a memory and stores data written in advance as tag data. The wireless tag 2 communicates with the tag reading apparatus 1 in a predetermined sequence and wirelessly transmits the stored tag data. The tag data stored in the wireless tag 2 contains a tag code as an identifier for identification of the individual wireless tag 2. Further, the tag data stored in the wireless tag 2 contains a merchandise code as an identifier for identification of the merchandise MEA with the wireless tag 2 attached thereto. The merchandise code may be contained as part of the tag code or separately from the tag code. The merchandise code may be e.g., a JAN (Japan article number) code.

The tag reading apparatus 1 includes an antenna 10, a movement mechanism 20, a tag communication unit 30, and a reading processing unit 40. The antenna 10 radiates electromagnetic waves according to a transmission high-frequency signal supplied from the tag communication unit 30. The antenna 10 receives the electromagnetic wave that is radiated from the wireless tag 2 and that propagates in the space and outputs an electrical signal according to the received electronic wave (hereinafter, referred to as "reception high-frequency signal".) The antenna 10 is placed under a table TAA and has a property communicable with the wireless tags 2 located in a predetermined reading space and a surrounding space. The reading space is defined as e.g., a space above the table TAA. It is assumed that the reading space is defined as e.g., a space including a basket BAA mounted on or otherwise supported by the table TAA. Accordingly, the space may be at least partially defined by the basket BAA. Note that the reading space may be appropriately defined by e.g., a designer of the tag reading apparatus 1 or the like.

The movement mechanism 20 (e.g., an actuator assembly) moves the antenna 10. The tag communication unit 30 executes a communication process for reading the tag data. The reading processing unit 40 executes an information process for generating e.g., a merchandise list as a list with respect to the merchandise MEA held in the basket BAA and placed within the reading space based on the reading result in the tag communication unit 30. It is desirable that the tag communication unit 30 is placed below the antenna 10.

The movement mechanism 20 includes a mechanism unit 21 (e.g., an actuator) and a movement control unit 22 (e.g., a movement controller). The mechanism unit 21 two-dimensionally moves the antenna 10 within a plane along the table TAA. Note that the tag reading apparatus 1 is used in e.g., a position in horizontal directions along x-axis directions and y-axis directions and vertical directions along z-axis directions in FIG. 1. The mechanism unit 21 moves the antenna 10 within an xy-plane, i.e., a horizontal plane. The movement control unit 22 controls motion of the mechanism unit 21 to move the antenna 10 in synchronization with the process in the reading processing unit 40. The movement control unit 22 monitors and reports the position of the antenna 10 as a reading position to the reading processing unit 40.

The tag communication unit 30 includes a baseband processor 31, a transmission unit 32, a duplexer 33, and a reception unit 34. The baseband processor 31 generates a transmission baseband signal for radiating an electromagnetic wave from the antenna 10 for reading the tag data from the plurality of wireless tags 2 in the predetermined sequence and provides the signal to the transmission unit 32 according to an instruction from the reading processing unit 40. The transmission unit 32 performs a known process such as modulation of a carrier wave using the transmission baseband signal provided from the baseband processor 31, obtains a transmission high-frequency signal, and provides the transmission high-frequency signal to the duplexer 33. The duplexer 33 supplies the transmission high-frequency signal provided from the transmission unit 32 to the antenna 10. The duplexer 33 supplies a reception high-frequency signal output from the antenna 10 to the reception unit 34 (e.g., a receiver).

The reception unit 34 performs a known process such as demodulation on the reception high-frequency signal provided from the duplexer 33, obtains a reception baseband signal, and provides the reception baseband signal to the baseband processor 31. The reception unit 34 (e.g., a sensor or transducer) detects a phase of the electromagnetic wave received by the antenna 10 based on the reception high-frequency signal and provides phase information representing the phase to the baseband processor 31. That is, the reception unit 34 has a function of a detection unit detecting phase. The baseband processor 31 tries to extract tag data from the reception baseband signal provided from the reception unit 34. Then, when successfully extracting the tag data, the baseband processor 31 outputs the tag data to the reading processing unit 40. The baseband processor 31 outputs the phase information provided from the reception unit 34 as information detected from the reception baseband signal as the extraction source of the tag data with the tag data to the reading processing unit 40.

The reading processing unit 40 (e.g., a reading controller) includes a processor 41, a main memory 42, an auxiliary memory unit 43, interface units 44, 45, 46, and a transmission line 47. The processor 41, the main memory 42, the auxiliary memory unit 43, and the interface units 44, 45, 46 can communicate via the transmission line 47.

The processor 41, the main memory 42, and the auxiliary memory unit 43 are connected by the transmission line 47 to form a computer performing an information process. The processor 41 corresponds to a brain portion of the computer. The processor 41 executes various information processes according to information processing programs such as an operating system, middleware, and application programs. The information processes executed by the processor 41 include an information process for generating the merchandise list, which will be described later.

The main memory 42 corresponds to a main memory portion of the computer. The main memory 42 includes a non-volatile memory area and a volatile memory area. The main memory 42 stores the information processing programs in the non-volatile memory area. The main memory 42 may store data necessary for execution of processes for the processor 41 to control the respective portions in the non-volatile or volatile memory area. The main memory 42 uses the volatile memory area as a work area in which data is appropriately rewritten by the processor 41.

The auxiliary memory unit 43 corresponds to an auxiliary memory portion of the computer. For example, as the auxiliary memory unit 43, known memory devices such as an electric erasable programmable read-only memory (EEPROM), a hard disc drive (HDD), and a solid state drive (SSD) may be used singly or in combination. The auxiliary memory unit 43 saves data used by the processor 41 for various processes and data generated by the processes in the processor 41. The auxiliary memory unit 43 stores the information processing programs. One of the information processing programs stored by the auxiliary memory unit 43 is an information processing program described regarding the information process for generating the merchandise list.

The movement control unit 22 is connected to the interface unit 44 (e.g., a communication interface). The baseband processor 31 is connected to the interface unit 45 (e.g., a communication interface). The POS terminal 3 is connected to the interface unit 46 (e.g., a communication interface). The interface units 44, 45, 46 interface sending and receiving of data between the movement control unit 22, the baseband processor 31, or the POS terminal 3 and the processor 41. As the interface units 44, 45, 46, e.g., known interface devices for connecting peripheral devices to a computer apparatus may be used. The transmission line 47 includes an address bus, a data bus, a control signal line, etc. and transmits data and control signals sent and received between the connected respective portions.

First Embodiment

Figure 2:
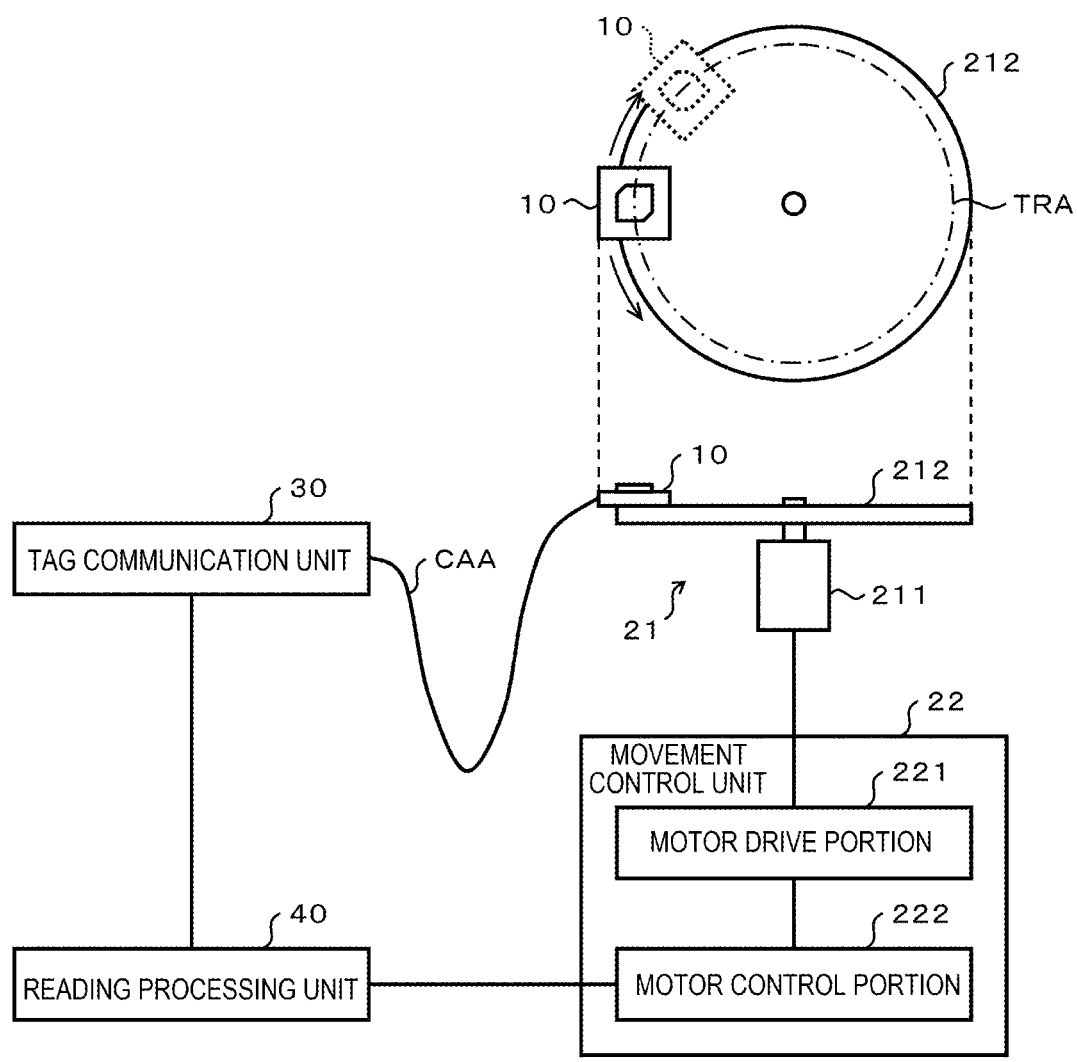
FIG. 2 shows specific configuration examples of a movement mechanism and a movement control unit in a first embodiment.

Subsequently, characteristic configurations in the first embodiment will be explained. FIG. 2 shows specific configuration examples of the mechanism unit 21 and the movement control unit in the first embodiment. Note that, of the elements shown in FIG. 2, the elements also shown in FIG. 1 have the same signs. The mechanism unit 21 includes a motor 211 and a stage 212 (e.g., a platter, a platform, etc.). Note that, in FIG. 2, regarding the motor 211, an appearance with respect to the xz-plane is shown. Further, regarding the stage 212, the lower part in FIG. 2 shows an appearance with respect to the xz-plane and the upper part shows an appearance with respect to the xy-plane.

The motor 211 (e.g., an actuator) generates a rotation force (e.g., a torque). In the first embodiment, as the motor 211, a known motor device that can make forward rotation and backward rotation may be used (e.g., an electric motor). The stage 212 has a disc shape (e.g., is circular or cylindrical), and an upper surface of the stage 212 faces the table TAA from below the table TAA. The rotation shaft of the motor 211 (and thus the corresponding axis of rotation) penetrates the stage 212 nearly at the center of the upper surface nearly (e.g., substantially) perpendicular to the upper surface. The stage 212 fixedly supports the antenna 10 attached to the peripheral edge of the upper surface to face the table TAA. The antenna 10 is electrically connected to the tag communication unit 30 by a cable CAA. The cable CAA is e.g., a coaxial cable.

The movement control unit 22 includes a motor drive portion 221 and a motor control portion 222. The motor drive portion 221 drives the motor 211 to rotate the motor 211 forward or backward at a predetermined rotation speed. The motor control portion 222 controls the motor drive portion 221 to rotate the motor 211 according to a predetermined sequence in response to a command from the reading processing unit 40. The motor control portion 222 may include one or more rotation sensors or angle sensors (e.g., potentiometers, optical encoders, a hall effect sensor that senses a magnet on the stage 212, etc.) that provides information identifying an angular orientation, angular position, or rotation angle of the stage 212.

Next, the operation of the tag reading apparatus 1 having the above described configuration will be explained. The details of the process to be described are examples, and a change of the sequence of part of the process, an omission of part of the process, or an addition of another process can be appropriately made. The operator of the POS terminal 3 places the basket BAA holding the merchandise MEA that a customer wishes to purchase in a predetermined position on the table TAA, and then, gives an instruction to start reading by a predetermined operation. Note that the operator of the POS terminal 3 may be a staff member or a customer. The POS terminal 3 requests reading to the tag reading apparatus 1 when an operation for the instruction is performed.

The request from the POS terminal 3 is taken into the reading processing unit 40 by the interface unit 46. Then, the processor 41 executes the following reading process according to the information processing program stored in the main memory 42 or the auxiliary memory unit 43.

Figure 3:
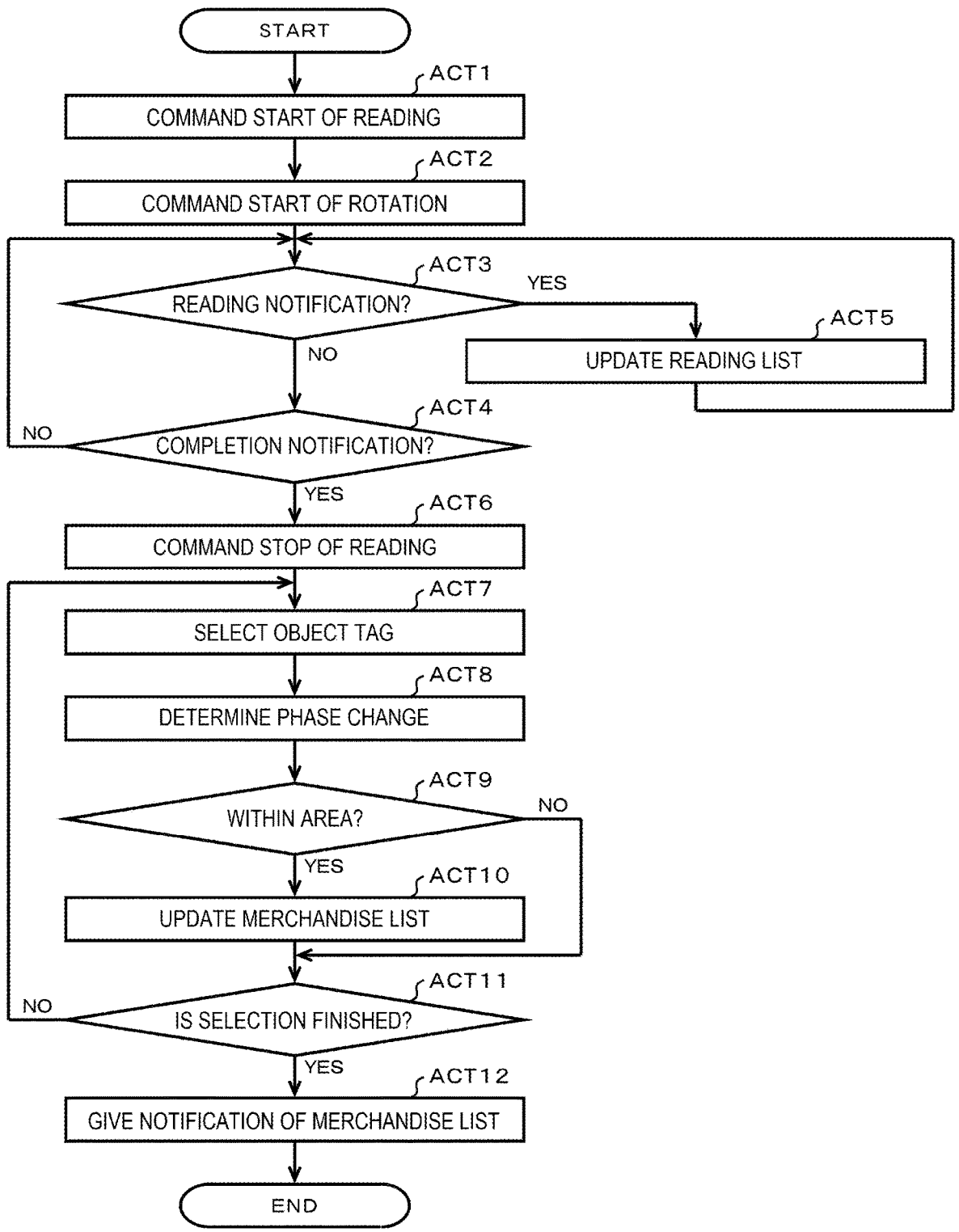
FIG. 3 is a flowchart of a reading process by a processor of the tag reading apparatus of FIG. 1.

FIG. 3 is a flowchart of the reading process by the processor 41. As ACT1, the processor 41 commands a start of reading of the tag data of the wireless tag 2 to the tag communication unit 30. For example, the processor 41 sends out a predetermined command signal for commanding the start of reading from the interface unit 45.

In the tag communication unit 30, the baseband processor 31 receives the above described command signal. Then, the baseband processor 31 outputs the transmission baseband signal to the transmission unit 32 and extracts the tag data from the reception baseband signal provided from the reception unit 34 for reading the tag data from all communicable wireless tags 2 by a predetermined protocol. When successfully extracting the tag data, the baseband processor 31 gives a reading notification to the reading processing unit 40. The baseband processor 31 gives a notification of the tag data and the phase information provided from the reception unit 34 in the reading notification. Note that the protocol may be a known protocol e.g., a protocol compliant to ISO/IEC 18000.

As ACT2, the processor 41 commands a start of rotation to the movement mechanism 20. For example, the processor 41 sends out a predetermined command signal for commanding the start of rotation from the interface unit 44.

In the movement mechanism 20, the motor control portion 222 of the movement control unit 22 receives the above described command signal. Then, the motor control portion 222 controls the motor drive portion 221 to start driving to rotate the motor 211 in a predetermined forward rotation direction. The motor control portion 222 monitors the rotation angle of the stage 212 based on the amount of rotation of the motor 211 and notifies the reading processing unit 40 of rotation angle information representing the rotation angle. When the rotation angle of the stage 212 becomes a predetermined specific angle, the motor control portion 222 ends the driving by the motor drive portion 221. Concurrently, the motor control portion 222 transmits a notification signal for a completion notification to the reading processing unit 40. With the rotation of the stage 212, the antenna 10 moves to draw a circular trajectory TRA (e.g., the antenna 10 moves along the circular trajectory TRA) shown by a dashed-dotted line in FIG. 2. Accordingly, the antenna 10 rotates about a center of the circular trajectory TRA. As shown, the antenna 10 rotates about an axis of rotation that passes through the center of the circular trajectory and the center line of the shaft of the motor 211. The above described forward rotation direction and specific angle may be arbitrarily determined by e.g., a designer of the movement mechanism 20 or the like. Note that the specific angle should be selected within a range where the cable CAA does not interfere with the movement of the antenna 10 with the rotation of the stage 212. In some embodiments, the specific angle is e.g., 360 degrees or degrees slightly smaller than 360 degrees. The length and the placement of the cable CAA are selected to avoid interfering with the movement of the antenna 10 with the rotation of the stage 212 over the specific angle. Then, the motor control portion 222 controls the motor drive portion 221 to start driving to rotate the motor 211 in a backward rotation direction. When the rotation angle of the stage 212 becomes the specific angle, the motor control portion 222 ends the driving by the motor drive portion 221. Thereby, the antenna 10 is returned to an initial position at the start of movement with the rotation in the forward rotation direction.

Note that the driving by the motor drive portion 221 may be ended according to a stop instruction from the processor 41. In this case, for example, when the rotation angle of the stage 212 becomes a predetermined specific angle, the motor control portion 222 transmits a notification signal for a completion notification to the reading processing unit 40 without ending the driving by the motor drive portion 221. Then, when the processor 41 determines YES at ACT4 in response to the notification signal, the processor commands a stop of rotation to the movement mechanism 20 prior to going to ACT6. Further, in this case, as ACT4, the processor 41 may check whether or not the rotation angle of the stage 212 becomes a predetermined specific angle based on the rotation angle information and, when the rotation angle becomes the specific angle, determine YES and command a stop of rotation to the movement mechanism 20.

The antenna 10 is fixedly supported by the stage 212. Accordingly, with the rotation of the stage 212, the orientation of the antenna 10 within the XY-plane changes, for example, as shown by a solid line and a dotted line in FIG. 2. Therefore, in the first embodiment, as the antenna 10, a circular polarized antenna is desirably used. Using another antenna than the circular polarized antenna, the sensitivity for the same wireless tag 2 may vary depending on the position of the antenna 10 and there may be a time when reception of the tag data is impossible. Note that, even when there is a time when reception of the tag data is impossible, interpolation is performed by the process at ACT8 and the determination at ACT9 can be made, and another antenna than the circular polarized antenna can be employed.

Here, the rotation speed of the motor 211 is determined so that the time for rotating the stage 212 over the specific angle may be sufficiently longer than the time taken for a series of processes for reading the tag data once from each wireless tag 2. Therefore, the baseband processor 31 repeatedly executes the series of processes for reading the tag data once from each wireless tag 2 at a plurality of times while the stage 212 is rotated over the specific angle. Thereby, reading of tag data is performed at a plurality of times for the same wireless tag 2 while the relative position relationship between the antenna 10 and the wireless tag 2 is two-dimensionally changed.

Note that, the longer the time for rotating stage 212 over the specific angle, the larger the number of times of reading of the tag data of the single wireless tag 2 and the higher the accuracy of the determination of the phase change, which will be described later. However, the longer the time, the longer the execution time of the reading process, which may interfere with operation of the store utilizing the tag reading apparatus 1. Accordingly, the rotation speed of the motor 211 is appropriately determined by e.g., a designer of the tag reading apparatus 1 or the like in consideration of the above described circumstances.

In the above described state in which the tag data is read while the antenna 10 is moved, the processor 41 goes to a standby state at ACT3 and ACT4. As ACT3, the processor 41 checks whether or not the reading notification is given. Then, the processor 41 determines NO if the event is not recognizable and goes to ACT4. As ACT4, the processor 41 checks whether or not the completion notification is given. Then, the processor 41 determines NO if the event is not recognizable and returns to ACT3. In this manner, in the standby state at ACT3 and ACT4, the processor 41 waits for the reading notification or the completion notification.

Then, when the reading notification given by the baseband processor 31 as described above is received by the interface unit 45, the processor 41 determines YES at ACT3 and goes to ACT5. As ACT5, the processor 41 updates a reading list. The reading list is list data representing a history of reading of the tag data. The reading list is an aggregate of data records respectively correlated with each reading notification. When first executing ACT5 after the start of the reading process, the processor 41 generates a new data record and generates a new reading list containing only the single data record. When executing ACT5 at the second time and the subsequent times, the processor 41 generates a new data record and updates the already existing reading list to add the data record. Note that the reading list is stored in the main memory 42 or the auxiliary memory unit 43.

Figure 4:
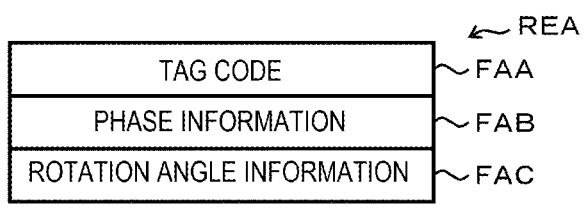
FIG. 4 schematically shows a configuration of one data record forming a reading list.

FIG. 4 schematically shows a configuration of one data record REA forming the reading list. The data record REA includes fields FAA, FAB, FAC. The processor 41 sets the tag code contained as the individual identifier of the wireless tag 2 in the tag data of the reading notification in the field FAA. The processor 41 sets the phase information of the reading notification in the field FAB. The processor 41 sets the rotation angle information of the notification from the motor control portion 222 when the reading notification is given in the field FAC.

Note that the processor 41 may set an elapsed time from the time when starting reading at ACT1 in the field FAC in place of the rotation angle information. In this case, the motor control portion 222 does not necessarily notify the reading processing unit 40 of the rotation angle information.

Then, when finishing update of the reading list, the processor 41 returns to the standby state at ACT3 and ACT4. In this manner, the processor 41 records the phase information and the rotation angle information in correlation with the tag code contained in the tag data at each time when new tag data is read by the tag communication unit 30. Then, when the notification signal for the completion notification transmitted from the motor control portion 222 when the rotation angle of the stage 212 becomes the predetermined specific angle is received by the interface unit 44, the processor 41 determines YES at ACT4 and goes to ACT6.

As ACT6, the processor 41 commands a stop of reading to the tag communication unit 30. The processor 41 sends out a predetermined command signal for commanding the stop of reading from the interface unit 45. In the tag communication unit 30, the baseband processor 31 receives the command signal. Then, the baseband processor 31 stops the above described process for reading the tag data. In the above described manner, the processor 41 generates the reading list as the list data recording the phase information and the rotation angle information in correlation with the tag codes contained in the tag data read in a period in which the stage 212 is rotated over the specific angle (hereinafter, referred to as "reading period").

As ACT7, the processor 41 selects one of the wireless tags 2 having tag data successfully read in the reading period as an object tag. As ACT8, the processor 41 determines a phase change with respect to the object tag. For example, the processor 41 extracts all data records REA having the tag codes as the object tags set in the field FAA from the reading list. The processor 41 obtains an approximate curve by plotting intersections of the phase and the rotation angle represented by the phase information and the rotation angle information respectively set in the fields FAB, FAC of the extracted data records REA in a coordinate system with the phase along the vertical axis and the rotation angle along the horizontal axis, and thereby, obtains a curve showing a phase change with the movement of the antenna 10 by the rotation of the stage 212. Note that, when the elapsed time is set in the field FAC in place of the rotation angle information, a similar curve may be obtained by the same processes using the elapsed time in place of the rotation angle information.

Figure 5:
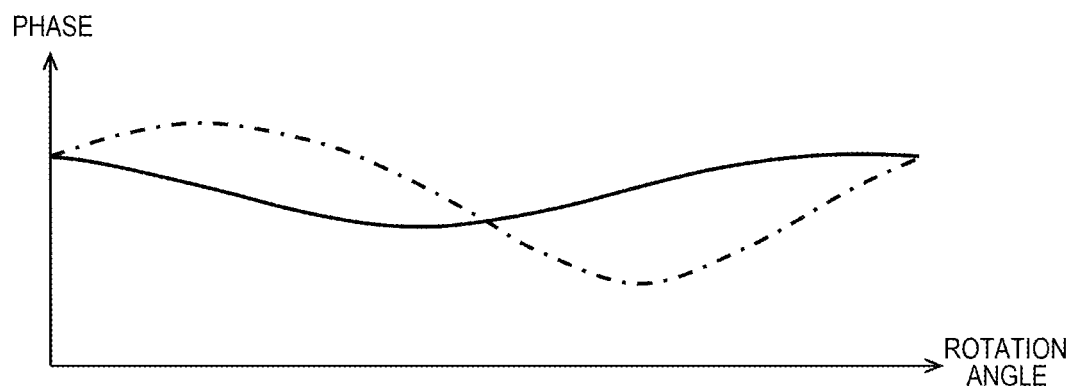
FIG. 5 shows examples of curves representing phase changes.

FIG. 5 shows examples of curves representing phase changes. A curve of a solid line and a curve of a dashed-dotted line are respectively obtained with respect to different wireless tags 2. The difference between the two curves shown in FIG. 5 appears by the difference in position between the two wireless tags 2. Since the position of the antenna 10 two-dimensionally changes, the phases with respect to the two wireless tags 2 in the different positions do not change completely in the same fashion, and the two curves with respect to the two wireless tags 2 in the different positions must be different. The shapes of the respective curves correspond to the positions of the wireless tags 2. For example, the curve of the solid line is a curve obtained with respect to the wireless tag 2 located within the basket BAA. Further, for example, the curve of the dashed-dotted line is a curve with respect to the wireless tag 2 located outside of the basket BAA. Note that the process for obtaining the curves as shown in FIG. 5 is an example of a regression analysis. Therefore, the processor 41 can use a known processing algorithm for regression analysis for the process here.

As ACT9, the processor 41 checks whether or not the object tag is located within a predetermined reading area based on the phase change determined at ACT8. Note that the reading area may be appropriately determined by e.g., a designer of the tag reading apparatus 1 or the like. For example, it is assumed that the reading area is defined as an area inside of the basket BAA. Note that the determination as to whether or not the curve of the phase change having the above described features is within the area changes according to various conditions including the shape of the reading area, the relative position relationship between the trajectory TRA and the reading area, etc. Accordingly, the processor 41 executes the determination as ACT8 according to an algorithm appropriately determined by e.g., a designer of the tag reading apparatus 1 or the like based on experiments, simulations, machine learning, or the like. Then, the processor 41 determines YES if the determination that the object tag is located within the area may be made and goes to ACT10. In this manner, the processor 41 executes the information process based on the information processing program, and thereby, the computer having the processor 41 as the brain portion functions as a determination unit.

As ACT10, the processor 41 updates a merchandise list. The merchandise list is list data of merchandise purchased by a customer. For example, when first executing ACT10 after the start of the reading process, the processor 41 generates a new merchandise list containing only one merchandise code contained in the tag code of the object tag or one merchandise code correlated with the tag code of the object tag in advance. When executing ACT10 at the second time and the subsequent times, if the merchandise list does not contain the merchandise code of the object tag, the processor 41 adds the merchandise code to the merchandise list and, when the merchandise list contains the merchandise code of the object tag, increases the number of merchandise codes by one. Note that the merchandise list is stored in the main memory 42 or the auxiliary memory unit 43.

When finishing update of the merchandise list, the processor 41 goes to ACT11. Note that the processor 41 determines NO at ACT9 if the determination that the object tag is located within the area may not be made, and passes ACT10 and goes to ACT11. That is, the processor 41 does not add the merchandise MEA with the wireless tag 2 located outside of the area attached thereto to the merchandise list.

As ACT11, the processor 41 checks whether or not to finish selecting all wireless tags 2 from which the tag data is readable in the reading period as object tags. Then, the processor 41 determines NO if the wireless tag 2 to be selected as the object tag remains and repeats the process at ACT7 and the subsequent ACTs. Note that the processor 41 selects the wireless tag 2 not yet selected as the object tag at ACT7. Thereby, the processor 41 repeats the process from ACT7 to ACT11 while sequentially setting the respective wireless tags 2 from which the tag data is readable in the reading period as the object tags.

Then, the processor 41 determines YES at ACT11 and goes to ACT12 when finishing selecting the respective wireless tags 2 from which the tag data is readable in the reading period as the object tags. As ACT12, the processor 41 notifies the POS terminal 3 of the merchandise list. Then, the processor 41 ends the reading process.

As described above, the tag reading apparatus 1 of the first embodiment two-dimensionally changes the relative position relationship between the antenna 10 and the wireless tag 2 by moving the antenna 10 to draw the circular trajectory TRA. Specifically, the antenna 10 rotates about an axis passing through the center of the circular trajectory and that is offset from the antenna 10, and a side of the antenna faces the center throughout the circular trajectory. Further, the tag reading apparatus 1 determines whether or not the wireless tag 2 is located within the reading area based on the phase change of the electromagnetic wave received when reading of the tag data is respectively performed for the same wireless tag 2 in a plurality of states in which the relative position relationship is two-dimensionally different, and the determination may be made with higher accuracy than that based on phase differences in a plurality of one-dimensionally different antenna positions.

Second Embodiment

Figure 6:
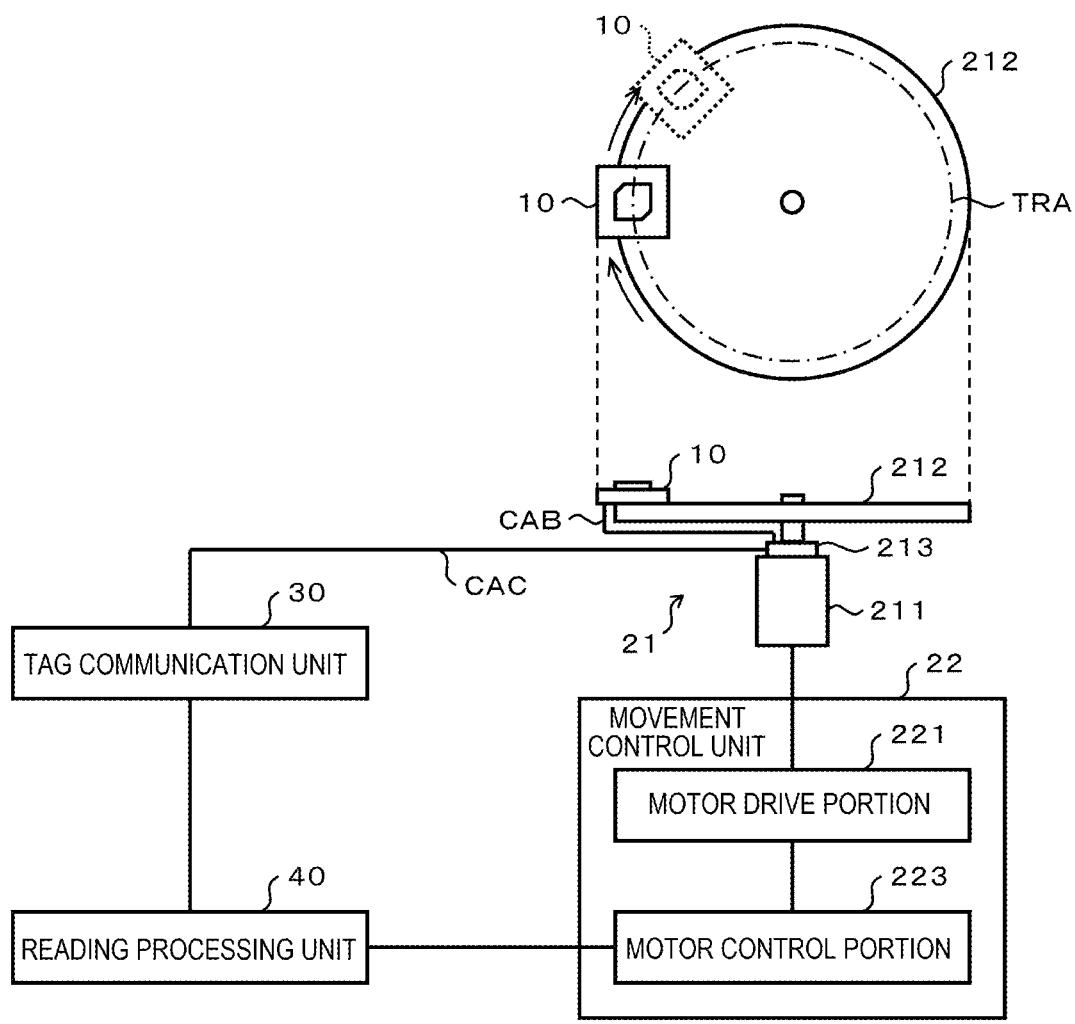
FIG. 6 shows specific configuration examples of the movement mechanism and the movement control unit in a second embodiment.

FIG. 6 shows specific configuration examples of the mechanism unit 21 and the movement control unit 22 in a second embodiment. Of the elements shown in FIG. 6, the elements also shown in FIGS. 1 and 2 have the same signs.

The second embodiment is different from the first embodiment in the configurations of the mechanism unit 21 and the movement control unit 22. In the second embodiment, the mechanism unit 21 includes a slip ring 213 in addition to the motor 211 and the stage 212. Further, in the second embodiment, the movement control unit 22 includes a motor control portion 223 in place of the motor control portion 222. Note that, as the motor 211, a device that can only rotate forward may be used. In FIG. 6, an appearance of the slip ring 213 with respect to the xy-plane is shown.

The slip ring 213 includes a rotating portion (e.g., a rotor) rotating with the rotation of the motor 211 and a stationary portion (e.g., a stator) remaining in a rest or stationary state regardless of the rotation of the motor 211 and electrically connected to the rotor. In place of the slip ring 213, another type of rotation connector may be used. The rotor of the slip ring 213 is electrically connected to the antenna 10 via a cable CAB. Note that the rotor of the slip ring 213 may be connected to the antenna 10 via a conductor pattern formed on the stage 212 instead of the cable CAB. The stator of the slip ring 213 is connected to the tag communication unit 30 via a cable CAC. The cables CAB, CAC are e.g., coaxial cables.

When receiving a command to start rotation from the reading processing unit 40, the motor control portion 223 controls the motor drive portion 221 to start driving for rotating the motor 211 in a predetermined forward rotation direction. The motor control portion 223 monitors the rotation angle of the stage 212 based on the amount of rotation of the motor 211 and notifies the reading processing unit 40 of rotation angle information representing the rotation angle. When rotating the stage 212 in one turn, the motor control portion 223 ends the driving by the motor drive portion 221. Concurrently, the motor control portion 223 transmits a notification signal for a completion notification to the reading processing unit 40. Note that the motor control portion 223 may give a completion notification when the rotation angle of the stage 212 becomes a specific angle determined to be smaller than 360 degrees.

A reading process executed by the processor 41 in the reading processing unit 40 in the second embodiment may be the same as that in the first embodiment. The operation of the tag reading apparatus 1 of the second embodiment is different from that of the first embodiment in that the motor 211 is not rotated backward after the end of the rotation of the stage 212 over the specific angle, however, the rest of the operation is nearly the same as that of the first embodiment.

In this manner, also, in the second embodiment, like the first embodiment, whether or not the wireless tag 2 is located within the reading area may be determined with high accuracy. According to the second embodiment, the cable CAC does not change in condition with the rotation of the motor 211, and may be shorter than the cable CAA and the degree of freedom of routing is higher.

Third Embodiment

Figure 7:
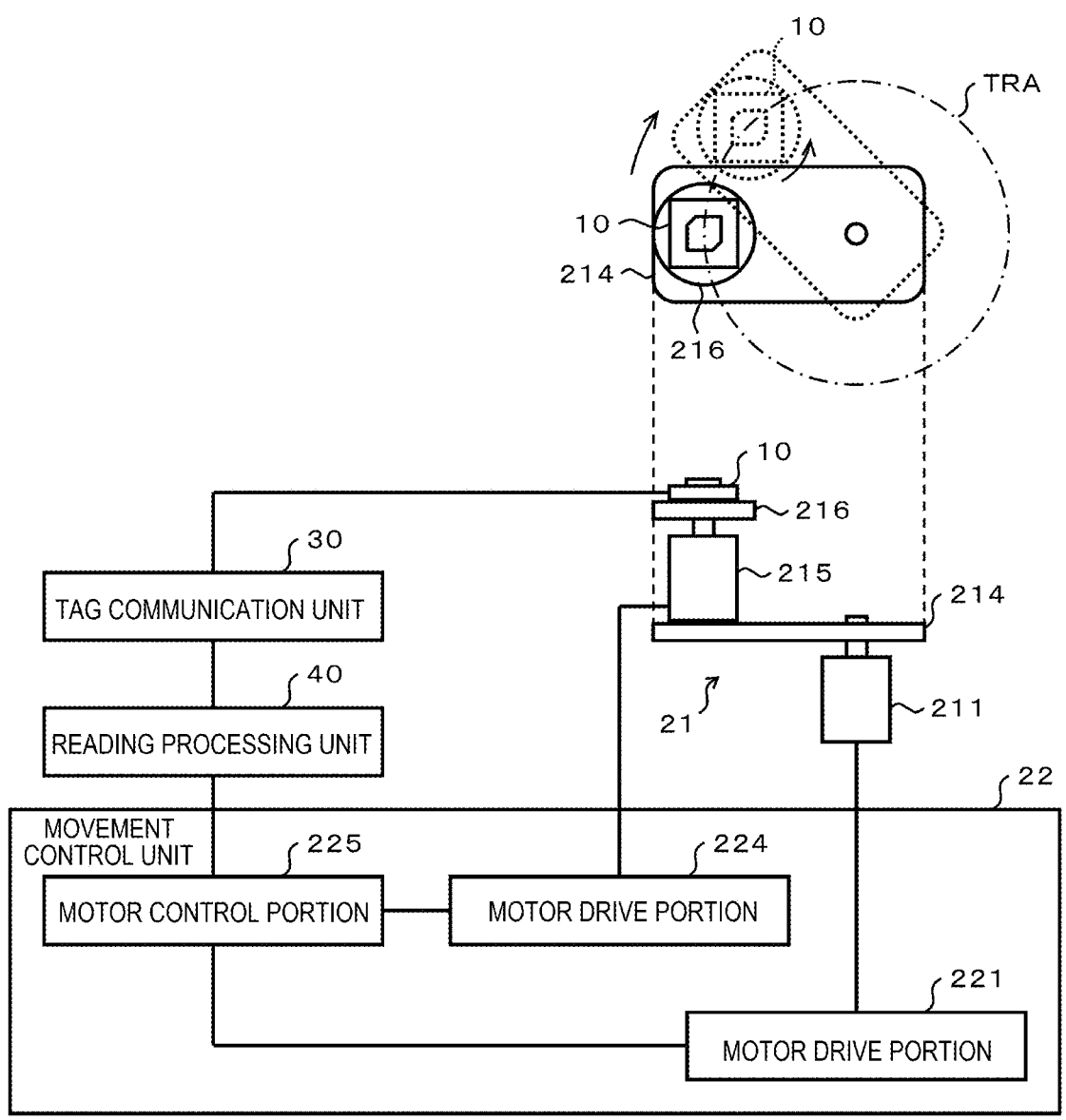
FIG. 7 shows specific configuration examples of the movement mechanism and the movement control unit in a third embodiment.

FIG. 7 shows specific configuration examples of the mechanism unit 21 and the movement control unit 22 in a third embodiment. Of the elements shown in FIG. 7, the elements also shown in FIGS. 1 and 2 have the same signs.

The third embodiment is different from the first embodiment in the configurations of the mechanism unit 21 and the movement control unit 22. In the third embodiment, the mechanism unit 21 includes the motor 211, a stage 214, a motor 215, and a stage 216. Further, in the third embodiment, the movement control unit 22 includes a motor drive portion 224 in addition to the motor drive portion 221 and includes a motor control portion 225 in place of the motor control portion 222. Note that, regarding the mechanism unit 21, in FIG. 7, appearances of the motors 211, 215 with respect to the xz-plane are shown. Further, regarding the stages 214, 216, the lower part in FIG. 7 shows appearances with respect to the xz-plane and the upper part shows appearances with respect to the xy-plane.

The stage 214 has a rectangular thin plate shape and an upper surface facing the table TAA below the table TAA. The rotation shaft of the motor 211 penetrates the stage 214 in a position closer to one end portion in the longitudinal direction nearly perpendicular to the upper surface. The stage 214 fixedly supports the motor 215 attached to the upper surface in a position closer to the other end portion in the longitudinal direction. Note that the stage 214 may be replaced by the stage 212 in the first embodiment. On the other hand, the stage 212 in the first embodiment or the second embodiment may be replaced by the stage 214 in the embodiment. That is, the shapes of the stages 212, 214 are arbitrary as long as the antenna 10 may move to draw the circular trajectory TRA with rotation.

The motor 215 is attached to the stage 216 in a position such that the rotation shaft thereof is nearly parallel to the rotation shaft of the motor 211. The rotation shaft of the motor 215 (and the corresponding axis of rotation) is radially offset from the rotation shaft of the motor 211 (and the corresponding axis of rotation). The motor 215 generates a rotation force in a predetermined forward rotation direction. The forward rotation direction of the motor 215 is the same as the backward rotation direction of the motor 211. The stage 216 has a disc shape and an upper surface facing the table TAA below the table TAA. The rotation shaft of the motor 215 penetrates the stage 216 nearly at the center of the upper surface nearly perpendicular to the upper surface. The stage 216 fixedly supports the antenna 10 attached to the center of the upper surface to face the table TAA. The shape of the stage 216 is arbitrary as long as the antenna 10 may be rotated with rotation without changes in position.

The motor control portion 224 drives the motor 215 to rotate the motor 215 at a predetermined rotation speed. The rotation speed of the motor 215 is the same as the rotation speed of the motor 211. When receiving a command to start rotation from the reading processing unit 40, the motor control portion 225 controls the motor drive portions 221, 224 to start driving for rotating both the motors 211, 215 in the forward rotation direction. The motor control portion 225 monitors the rotation angle of the stage 214 based on the amount of rotation of the motor 211 and notifies the reading processing unit 40 of rotation angle information representing the rotation angle. When rotating the stage 214 in one turn, the motor control portion 225 ends the driving by the motor drive portions 221, 224. Concurrently, the motor control portion 225 transmits a notification signal for a completion notification to the reading processing unit 40. Note that the motor control portion 225 may give a completion notification when the rotation angle of the stage 212 becomes a specific angle determined to be smaller than 360 degrees.

Also, in the third embodiment, a reading process executed by the processor 41 in the reading processing unit 40 may be the same as that in the first embodiment. The operation of the tag reading apparatus 1 of the third embodiment is the same as that of the first embodiment in that the antenna 10 moves to draw the circular trajectory TRA according to the rotation of the stage 214. Specifically, the antenna 10 rotates about an axis passing through the center of the circular trajectory TRA and that is offset from the antenna 10. In the third embodiment, the stage 216 is rotated at the same rotation speed as that of the stage 214 in the opposite direction to the rotation direction of the stage 214, and thereby, while the antenna 10 is moved, the orientation of the antenna 10 within the XY-plane is not changed as shown by e.g., the solid line and the broken line shown in FIG. 7 (e.g., a side of the antenna 10 faces in a fixed direction). Specifically, the antenna 10 pivots about an axis passing through or aligned with the antenna 10.

In this manner, also, in the third embodiment, like the first embodiment, whether or not the wireless tag 2 is located within the reading area may be determined with high accuracy. According to the third embodiment, the orientation of the antenna 10 within the XY-plane is not changed, and thereby, even when another antenna than the circular polarized antenna is used as the antenna 10, tag data can be received regardless of the rotation angle of the stage 214.

Fourth Embodiment

Figure 8:
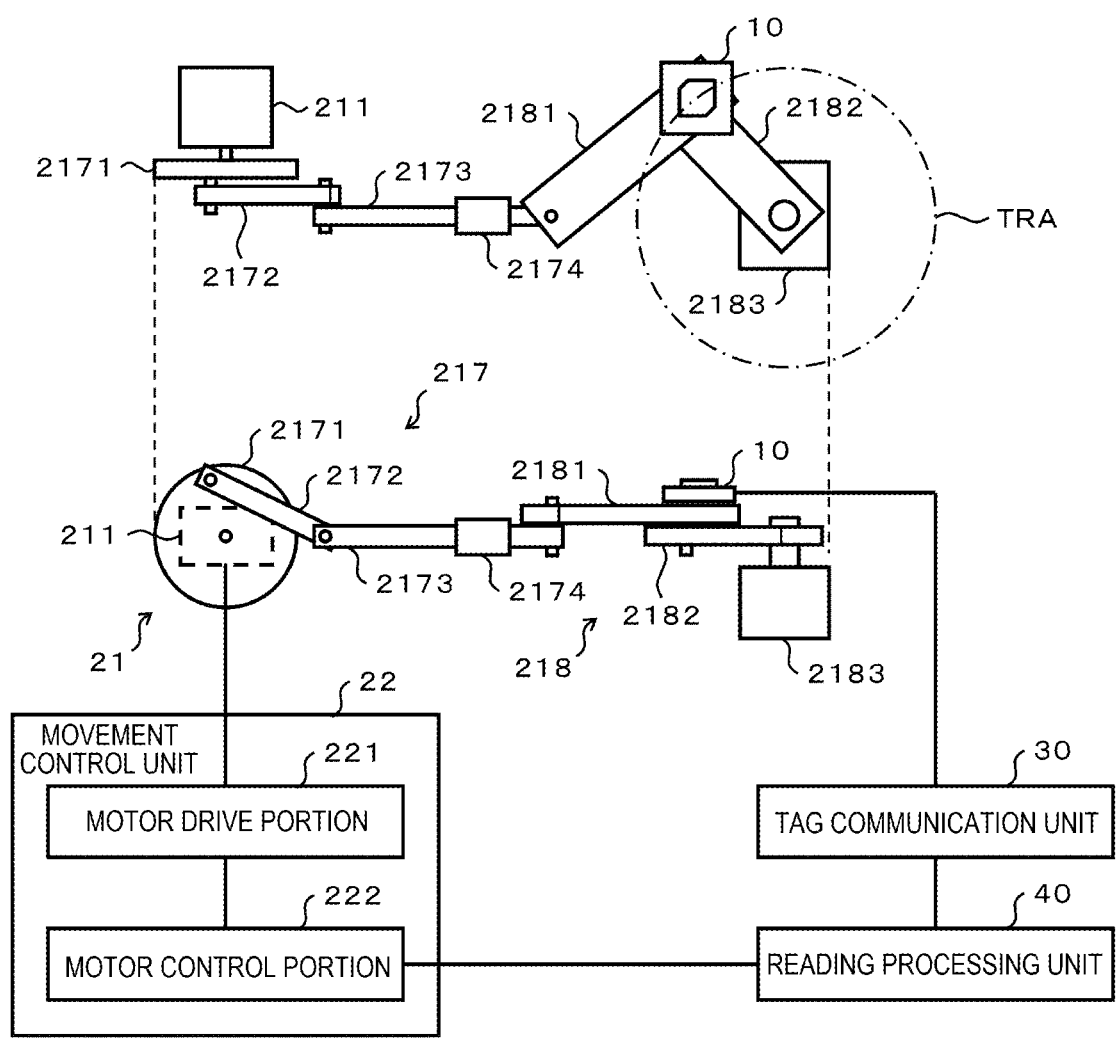
FIG. 8 shows specific configuration examples of the movement mechanism and the movement control unit in a fourth embodiment.

FIG. 8 shows specific configuration examples of the mechanism unit 21 and the movement control unit 22 in the fourth embodiment. Of the elements shown in FIG. 8, the elements also shown in FIGS. 1 and 2 have the same signs.

The fourth embodiment is different from the first embodiment in the configuration of the mechanism unit 21. In the fourth embodiment, the mechanism unit 21 includes the motor 211 and conversion mechanisms 217, 218 (e.g., linkages). Note that, regarding the mechanism unit 21, the lower part in FIG. 8 shows appearances of the conversion mechanisms 217, 218 with respect to the xz-plane and the upper part shows appearances with respect to the xy-plane.

The conversion mechanism 217 includes a rotating portion, shown as rotor 2171, rods 2172, 2173, and a guide 2174. The conversion mechanism 217 converts the rotation force generated by the motor 211 into reciprocation motion of the rod 2173. The conversion mechanism 218 includes a stage 2181, a plate 2182, and an axial support portion 2183. The conversion mechanism 218 converts the reciprocation motion of the rod 2173 into a rotation force around a rotation shaft orthogonal to the rotation shaft of the motor 211. The antenna 10 is attached to the stage 2181 of the conversion mechanism 218, and the antenna 10 is moved to draw the circular trajectory TRA by the rotation force obtained by the conversion. The position of the plate 2182 with respect to the z-axis direction is the same as the position of the rod 2173 with respect to the z-axis direction. The center of the trajectory TRA is located on the extension of the movement route of the reciprocation motion of the rod 2173 (e.g., an axis along which the rod 2173 reciprocates intersects an axis of rotation of a shaft of the motor 2183 and the plate 2182). Accordingly, the antenna 10 rotates about an axis passing through the center of the circular trajectory TRA and that is offset from the antenna 10. The antenna 10 pivots about an axis passing through or aligned with the antenna 10

Also, in the fourth embodiment, the operations of the movement control unit 22 and the tag communication unit 30 may be the same as those of the first embodiment. Also, in the fourth embodiment, a reading process executed by the processor 41 in the reading processing unit 40 may be the same as that in the first embodiment. The operation of the tag reading apparatus 1 of the fourth embodiment is the same as that of the first embodiment in that the antenna 10 moves to draw the circular trajectory TRA. In the fourth embodiment, the orientation of the antenna 10 within the XY-plane is not changed (e.g., remains constant) while the antenna 10 is moved by the conversion mechanism 218 like the third embodiment.

In this manner, also, in the fourth embodiment, like the first embodiment, whether or not the wireless tag 2 is located within the reading area may be determined with high accuracy. Further, according to the fourth embodiment, the orientation of the antenna 10 within the XY-plane is not changed, and thereby, even when another antenna than the circular polarized antenna is used as the antenna 10, tag data can be received regardless of the rotation angle of the stage 2181.

The following various modifications can be made to the embodiments. In the first embodiment, if the motor 211 is stopped when the rotation angle of the stage 212 by the forward rotation of the motor 211 becomes the specific angle, the state may be maintained and the stage 212 may be rotated over the specific angle by the backward rotation of the motor 211 in response to a command to start rotation in the next reading process.

In all of the respective embodiments, any method may be used for the method of using the determination result as to whether or not the wireless tag is within the reading area. For example, the tag reading apparatus 1 may output the read tag data only when the wireless tag is within the reading area without creating the merchandise list. Or, for example, the tag reading apparatus 1 may generate list data representing respective read tag data and correlating information showing determination results as to whether or not the wireless tag is within the reading area with each tag data. Or, for example, the tag reading apparatus may be an apparatus that determines whether or not a wireless tag 2 identified by a designated tag code exists within the reading area.

In all of the respective embodiments, a technique of evaluating the phase change by the processor 41 can be arbitrarily changed. Or, the processor 41 may evaluate a tendency of a plurality of phases detected with respect to each wireless tag 2 in a form different from that of the phase change with the position change.

The mechanism unit 21 may move the antenna 10 to draw a trajectory having a shape different from the circular shape using e.g., a x-y stage having a known structure.

The output destination of the determination results as to whether or not the wireless tag is within the reading area is not limited to the POS terminal 3. Or, the determination results as to whether the wireless tag is within the reading area may be stored in e.g., the auxiliary memory unit 43 without being output.

The wireless tag 2 may be moved without moving of the antenna 10 or both the antenna 10 and the wireless tag 2 may be moved at the same time. Or, the antenna 10 may be moved in a partial period of the reading period and the wireless tag 2 may be moved in the rest of the reading period.

Regarding the respective functions realized by the processor 41 by the information process, part or all of the functions can be realized by hardware executing an information process not based on a program such as a logic circuit. Further, each of the respective functions can be realized by a combination of hardware such as the logic circuit with software control.

While certain embodiments have been described, these embodiments are presented as examples, but not intended to limit the scope of the invention. These novel embodiments may be implemented in other various forms and various omissions, replacements, changes may be made without departing from the scope of the invention. These embodiments or their modifications are within the scope of the invention and within the scope of the invention described in claims and equivalents thereof.

What is claimed is:

1. A communication apparatus comprising:
a circular polarized antenna;
an actuator assembly configured to move the circular polarized antenna along a circular trajectory in both a first direction and a second direction relative to a space configured to contain a wireless tag, the first direction being non-parallel with the second direction;
a transducer operatively coupled to the circular polarized antenna and configured to provide phase data indicating a phase of a signal transmitted from the wireless tag to the circular polarized antenna in at least (a) a first detection condition in which the circular polarized antenna has a first position relative to the space and (b) a second detection condition in which the circular polarized antenna has a second position relative to the space; and
a controller configured to determine whether the wireless tag is located inside of the space based on the phase data,
wherein the actuator assembly is configured to orient the circular polarized antenna such that a side of the circular polarized antenna faces toward a center of the circular trajectory in both the first detection condition and the second detection condition.

2. The communication apparatus of claim 1, wherein the actuator assembly is configured to orient the antenna such that the side of the antenna faces toward the center of the circular trajectory throughout the circular trajectory of the antenna.

3. The communication apparatus of claim 1, wherein the actuator assembly is configured to pivot the antenna about an axis that passes through the antenna.

4. The communication apparatus of claim 1, wherein the actuator assembly is configured to rotate the antenna about an axis that is offset from the antenna.

5. The communication apparatus of claim 1, wherein:
the actuator assembly is configured to pivot the antenna about a first axis that passes through the antenna; and
wherein the actuator assembly is configured to rotate the antenna about a second axis that is offset from the first axis.

6. The communication apparatus of claim 5, wherein:
the actuator assembly is configured to pivot the antenna about the first axis in a first rotational direction; and
wherein the actuator assembly is configured to rotate the antenna about the second axis in a second rotational direction opposite the first rotational direction.

7. The communication apparatus of claim 6, wherein a rotation speed of the antenna about the first axis is equal to a rotation speed of the antenna about the second axis.

8. The communication apparatus of claim 1, wherein the actuator assembly includes a platform coupled to the antenna and a motor configured to drive rotation of the platform.

9. The communication apparatus of claim 1, further comprising a slip ring electrically coupling the antenna to the transducer.

10. The communication apparatus of claim 1, wherein the actuator assembly is configured to move the antenna within a horizontal plane.

11. The communication apparatus of claim 1, wherein the space is at least partially defined by a shopping basket.

12. A communication method, comprising:
providing, by a transducer, first phase data indicating a phase of a signal transmitted from a wireless tag to an antenna when the antenna is in a first position;
moving, by an actuator, the antenna along a circular trajectory in a first direction and a second direction within a plane and relative to a predetermined space from the first position to a second position by rotating the antenna about a first axis, the first direction being non-parallel with the second direction, wherein a side of the antenna faces toward a fixed direction in both the first position and the second position;
providing, by the transducer, second phase data indicating a phase of the signal transmitted from the wireless tag to the antenna when the antenna is in the second position; and
determining, by a controller, whether the wireless tag is located inside of the predetermined space based on the first phase data and the second phase data.

13. The communication method of claim 12, wherein moving the antenna includes rotating the antenna about a second axis offset from the first axis.

14. The communication method of claim 13, wherein moving the antenna includes rotating the antenna about the first axis and about the second axis at equal speeds.

15. The communication method of claim 12, wherein the first axis is a substantially vertical axis.

16. The communication apparatus of claim 12, wherein the side of the antenna faces toward the fixed direction throughout the circular trajectory of the antenna.

17. A communication apparatus comprising:
a table configured to support a shopping basket;
an antenna;
an actuator configured to move the antenna along a circular trajectory in a first direction and a second direction within a horizontal plane and relative to the table, the first direction being non-parallel with the second direction;
a transducer operatively coupled to the antenna and configured to provide data characterizing a signal transmitted from a wireless tag to the antenna when the antenna is in a first position and when the antenna is in a second position, the antenna facing toward a fixed direction in both the first position and the second position; and
a controller configured to determine whether the wireless tag is located inside of the shopping basket based on the data.

18. The communication apparatus of claim 17, wherein the side of the antenna faces toward the fixed direction throughout the circular trajectory of the antenna.

* * * * *